July 31, 1945.    F. W. MEREDITH    2,380,538
BOTTOM-HEAVY GYROSCOPE
Filed Feb. 21, 1944
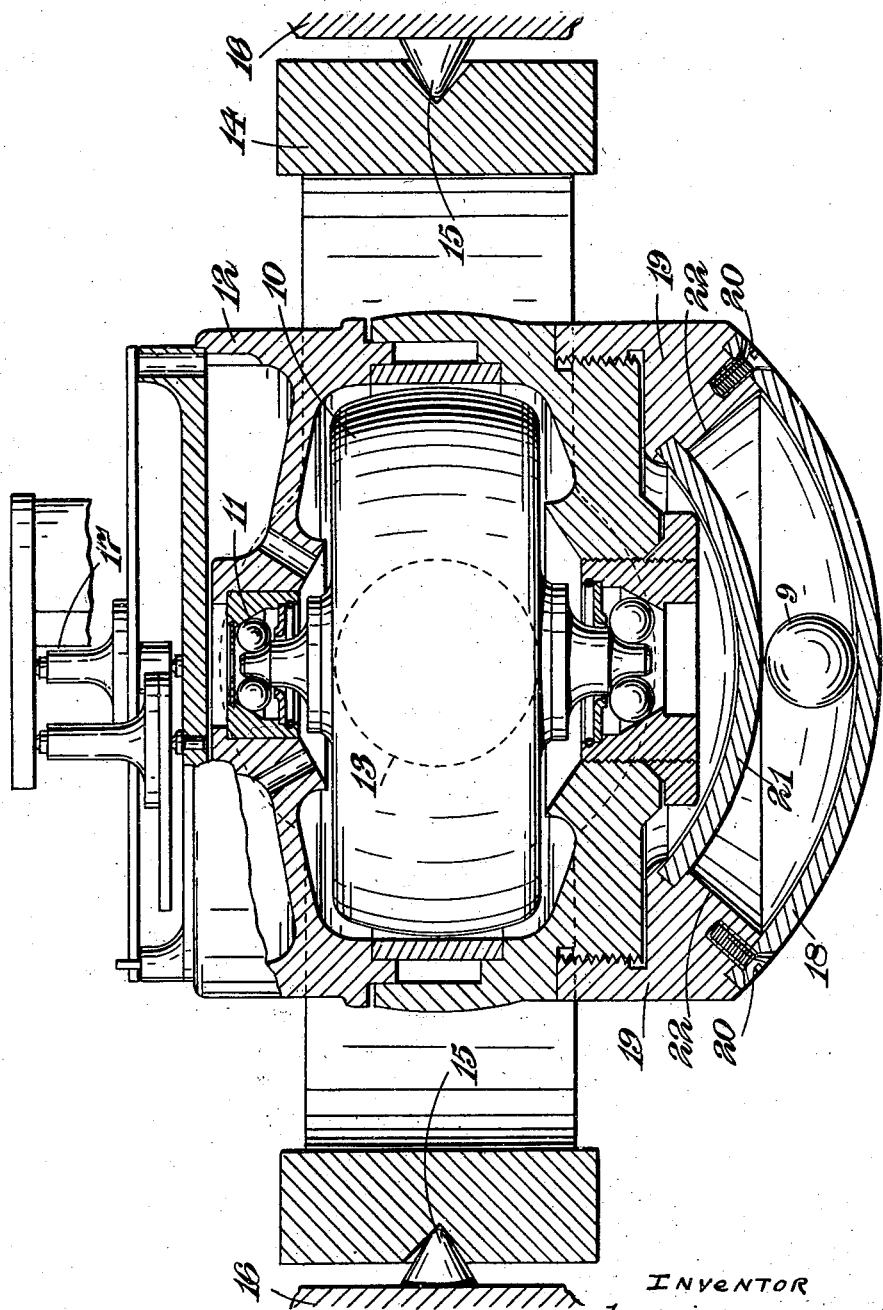
INVENTOR
Frederick Wm. Meredith
By Watson, Cole, Grindle & Watson
ATTY.

Patented July 31, 1945

2,380,538

UNITED STATES PATENT OFFICE 2,380,538

BOTTOM-HEAVY GYROSCOPE

Frederick William Meredith, London, England, assignor to S. Smith & Sons (England) Limited, a British company Application February 21, 1944, Serial No. 523,342
In Great Britain May 19, 1943

2 Claims. (Cl. 74—5)

This invention relates to gyroscopes having three degrees of freedom such as artificial horizons and directional gyroscopes.

Such a gyroscope is maintained with its rotors in the normal operating position by erecting devices, but if the axis of the gyroscope rotor is displaced by an appreciable amount from its normal position it will take the erecting devices a considerable time to return it to normal. The erecting devices do not operate when the gyroscope rotor is not running, so that it is then possible for the axis of the gyroscope rotor to become displaced by as much as 180° from its normal position, consequently it may not be fully operative for some considerable time after starting up. It is therefore usual to make the part in which the rotor is rotatably mounted bottom-heavy with respect to the axis of the pivots which support said part, thereby ensuring that the axis of the rotor and its rotational mounting is maintained in approximately the normal position, even when not running. This bottom-heaviness, however, causes disturbance of the gyroscope when operative if the mass is subjected to acceleration in a direction to apply a torque to said part about said pivots, and these disturbances will take some time to settle down. Thus, if a bomber aircraft is taking violent evading action preparatory to delivering a bombing attack, the artificial horizon may become so disturbed that it will not settle down in time for the bombing run. The present invention is directed towards overcoming this difficulty.

According to this invention, a gyroscope comprises a rotor, a mounting for said rotor arranged to permit movement of the axis of rotation of said rotor about two axes transversely arranged to one another and to said axis of rotation, a cup-shaped member secured to that part in which said rotor rotates, a ball in said cup, which cup is so shaped as to permit a limited unresisted movement of the ball and thereby unresisted movement of the axis of rotation from a datum position, whereafter the ball exerts a restoring torque through the wall of the cup, tending to move the axis of rotation back towards the datum position. For example, the lower part of said cup may be spherical having its centre of curvature at the point of intersection of said two axes, and a peripheral abutment face may be provided on said cup for limiting the movement of the ball in relation to the cup. Thus, when the ball comes into contact with said peripheral wall it imparts a torque tending to return the mounting to its initial position.

The following is a description of one embodiment of the invention as applied to a gyroscopic device such as an artificial horizon suitable for use on aircraft, and which is responsive to movements about the pitch and roll axes, reference being made to the accompanying drawing, which is a vertical cross-section through the gyroscope.

Referring to the drawing, the rotor 10 is rotatably mounted in bearings 11 within the casing 12, which is carried by gimbal bearings 13 in an outer gimbal ring 14. The gimbal ring 14 in its turn is carried by pivot bearings 15 on a support 16. When the rotor is rotating it is maintained with its axis in a predetermined position by erecting devices indicated generally at 17. As indicated earlier in the specification, should the rotor not be rotating, unless the casing is rendered bottom-heavy it might remain displaced about said axes to such an extent that when the rotor was restarted it would take a considerable time for the erecting means to bring the rotor axis back to the required position. To overcome this difficulty, the usual method is to render the rotor casing bottom-heavy so that it tends to remain with the rotor axis in the predetermined position. This, however, reduces the sensitivity of the apparatus. The present invention provides means for rendering the casing bottom-heavy only when it has moved beyond those limits where the erecting means cannot become operative sufficiently quickly. This is effected by providing the casing with a cup-shaped bottom member 18 secured thereto by an internally threaded ring 19, the cup-shaped member being secured to the ring by set-screws 20. The top of the cup-shaped member is closed by a dished cover-plate 21. The cup-shaped member 18 has a part-spherical surface having its geometric centre at the intersection of the axes of the gimbal bearings 13 and 15. A ball 9 is disposed in the space between the spherical cup-shaped member 18 and the cover-plate 21. The ring 19 is provided with an internal conical abutment face 22, the cone angle and diameter being selected so as to limit the freedom of movement of the ball beyond the position where the erecting devices would not obtain a sufficiently quick response.

When the gyroscope is erected to its normal vertical position and not subjected to lateral acceleration forces, the ball rests in the centre of the curved base of the cup. Any lateral acceleration force will now displace the ball from the centre of the cup until the ball reaches a position in which this force is balanced by the reaction between the ball and the base of the cup, and the force due to the earth's gravitational field. The cup is of such a size that the balanced position of the ball can never be such that it engages the side wall under any acceleration conditions likely to be experienced in normal flight, and consequently the ball will not exert any torque during normal flight when the gyroscope rotor is rotating.

If, on the other hand, while the gyroscope is not running the casing is displaced to such an extent that the ball engages the conical abutment face it will exert a torque tending to restore the casing to a position in which the ball rests on the base of the cup. This ensures that when the gyroscope is run up it is approximately vertical, the maximum departure from the vertical being determined by the size of the curved base of the cup. The size of the base of the cup is chosen so as to make this departure as small as possible, consistent with the above-mentioned requirement that the ball should not engage the side wall during normal flight.

I claim:

1. A gyroscope comprising a rotor, a mounting for attachment of the rotor to a support and arranged to permit pivotal movement of the rotor axis about two axes transverse to one another and to the vertical, a cup-shaped member secured to said mounting beneath said transverse axes with its mouth directed upwardly, the lower part of which cup is spherical having its centre of curvature at the point of intersection of the transverse axes, a ball in said cup and a peripheral abutment face on said cup for limiting the extent of movement of the ball in relation to the cup.

2. A gyroscope comprising a rotor, a mounting for attachment of the rotor to a support and arranged to permit pivotal movement of the rotor axis about two axes transverse to one another and to the vertical, a cup-shaped member secured to said mounting beneath said transverse axes with its mouth directed upwardly, the lower part of which cup is spherical having its centre of curvature at the point of intersection of the transverse axes, a ball in said cup and a conical abutment face around the periphery of the cup for limiting the extent of movement of the ball in relation to the cup.

FREDERICK WILLIAM MEREDITH.